US006401613B1

(12) United States Patent
Gayle et al.

(10) Patent No.: US 6,401,613 B1
(45) Date of Patent: Jun. 11, 2002

(54) PRINTING CYLINDER SLEEVE ASSEMBLY

(75) Inventors: Gregory J. Gayle, Bear, DE (US); Anthony Bart, Cherry Hill, NJ (US)

(73) Assignees: Xymid, LLC, Newark; E.I. Du Pont de Nemours & Co., Wilmington, both of DE (US)

( * ) Notice: Subject to any disclaimer, the term of this patent is extended or adjusted under 35 U.S.C. 154(b) by 0 days.

(21) Appl. No.: 09/618,959

(22) Filed: Jul. 20, 2000

Related U.S. Application Data

(60) Provisional application No. 60/206,340, filed on May 23, 2000.

(51) Int. Cl.[7] .......................... B41F 13/10; B29C 43/46

(52) U.S. Cl. ............................ 101/375; 101/479; 492/4

(58) Field of Search ................................ 101/477, 479, 101/375, 376, 401.1, 216; 492/2, 4

(56) References Cited

U.S. PATENT DOCUMENTS 4,903,597 A * 2/1990 Hoage et al. ............... 101/375
5,216,954 A * 6/1993 Thompson .................. 101/375
5,245,923 A * 9/1993 Vrotacoe .................... 101/375
5,256,459 A * 10/1993 Carlson ...................... 101/375
5,398,604 A * 3/1995 Burke ......................... 101/216
5,429,048 A * 7/1995 Gaffney et al. ............. 101/375
5,507,228 A * 4/1996 Schulz ........................ 101/375
5,544,584 A * 8/1996 Thompson et al. ......... 101/375
5,706,731 A * 1/1998 Francille et al. ............ 101/375
5,782,181 A * 7/1998 Russini ....................... 101/375
5,819,657 A * 10/1998 Rossini ....................... 101/375
5,840,386 A * 11/1998 Hatch ......................... 101/375
5,860,360 A * 1/1999 Lawe, III et al. ........... 101/376

* cited by examiner

*Primary Examiner*—Eugene Eickholt
(74) *Attorney, Agent, or Firm*—Connolly Bove Lodge & Hutz LLP

(57) ABSTRACT

A printing cylinder sleeve assembly comprises an inner sleeve made of tubular form from a material which is capable of expanding upon the application of air pressure to the inner surface of the inner sleeve. An outer sleeve is mounted over the inner sleeve in a slip fit manner so that the outer sleeve could be mounted over the inner sleeve assembly comprising the inner sleeve and the outer sleeve and the assembly as a unit can then be mounted over the printing cylinder.

28 Claims, 2 Drawing Sheets

PRINTING CYLINDER SLEEVE ASSEMBLY

CROSS-REFERENCE TO RELATED APPLICATION

This application is based on provisional application Ser. No. 60/206,340, filed May 23, 2000.

BACKGROUND OF THE INVENTION

The printing industry uses sleeves for mounting printing plates on the print cylinder so that the printing plate is not mounted directly on the cylinder. This results in the advantage that one can leave the printing plates mounted to the less expensive sleeve rather than requiring unmounting the plates or having to tie up an expensive print cylinder. There is a likelihood that the same printing plate will be used in the near future and thus using the sleeve will save on set up time.

Various approaches have been taken in the art to provide carrier sleeves for such printing cylinders. Reference is made to U.S. Pat. Nos. 3,978,254, 4,030,415, 4,601,928, 4,903,597, 5,215,013, 5,256,459, 5,301,610, 5,425,693 and 5,458,708 which exemplify known approaches. All of the details of these patents are incorporated herein by reference thereto.

SUMMARY OF THE INVENTION

An object of this invention is to provide an improved printing cylinder sleeve assembly which overcomes various disadvantages of the prior art approaches.

A further object of this invention is to provide such a printing cylinder sleeve assembly which would be economical to make and easy to install and use, In accordance with this invention the printing cylinder sleeve assembly comprise an inner or bridge sleeve which would be mounted directly on the print cylinder. A thin outer sleeve would be mounted over the bridge sleeve with the outer dimension of the bridge sleeve and the inner dimension of the outer sleeve being such that the mounting is by way of a clip fit rather than an interference fit.

THE DRAWINGS

DETAILED DESCRIPTION

Figure 1:
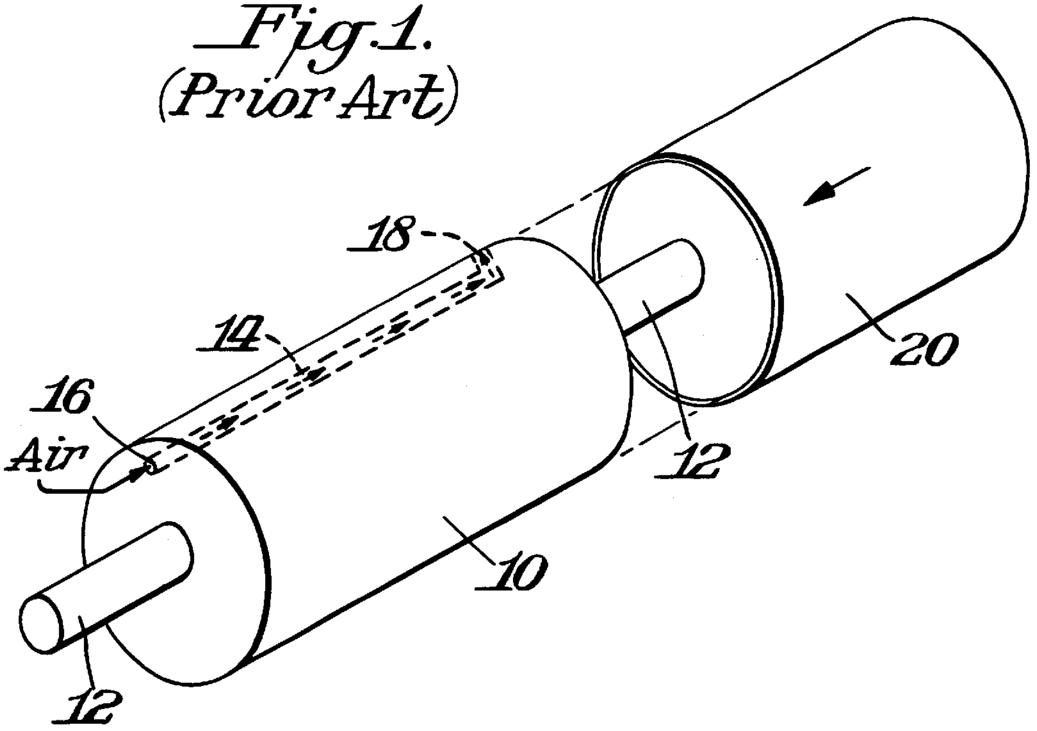
Fig. 1. (Prior Art)
FIGS. 1–3 are perspective views of different prior art printing cylinder sleeve assemblies.

The problem addressed by the present invention is to provide a sleeve assembly for mounting over a printing cylinder in the flexography industry so that a printing plate could be mounted to the sleeve instead of directly on the print cylinder. Various attempts have been made in the prior art to provide suitable sleeve assemblies. FIG. 1 illustrates a basic approach taken by the prior art. As shown therein a printing cylinder 10 has a shaft 12. An air duct 14 is provided in cylinder 10 near its periphery with the duct 14 having an inlet 16 and an outlet 18. Air duct is may take any suitable form such as being a hollow cylinder. In the prior art approach technique shown in FIG. 1 a sleeve 20 is used which is made of a thickness in, for example, the range of 0.005–0.120 inches. Thus, the thin sleeve 20 slides directly over the print cylinder 10. As sleeve 20 is being longitudinally mounted on cylinder 10, compressed air is fed through inlet 16 into duct 14 and is discharged through outlet 18 against the inner surface of sleeve 20 in order to expand sleeve 20 and slide it over the cylinder in the direction shown by the arrow in FIG. 1. When the air pressure is turned off, after sleeve 20 is in its desired position sleeve 20 contracts around the cylinder to result in a tight grip.

Frequently it is necessary to increase the circumference or repeat as it is known in the industry. This can be achieved by three different methods. One method would be to use a larger print cylinder. Another method would be to use a thick sleeve. A third method would be to use a bridge or inner sleeve and then a thin sleeve on the outside of the bridge sleeve. The advantage of the assembly which uses a bridge sleeve and an outer sleeve is that it is necessary to purchase an expensive bridge sleeve only once and leave the plates mounted on the less expensive thin sleeves thus giving economical benefits.

Figure 2:
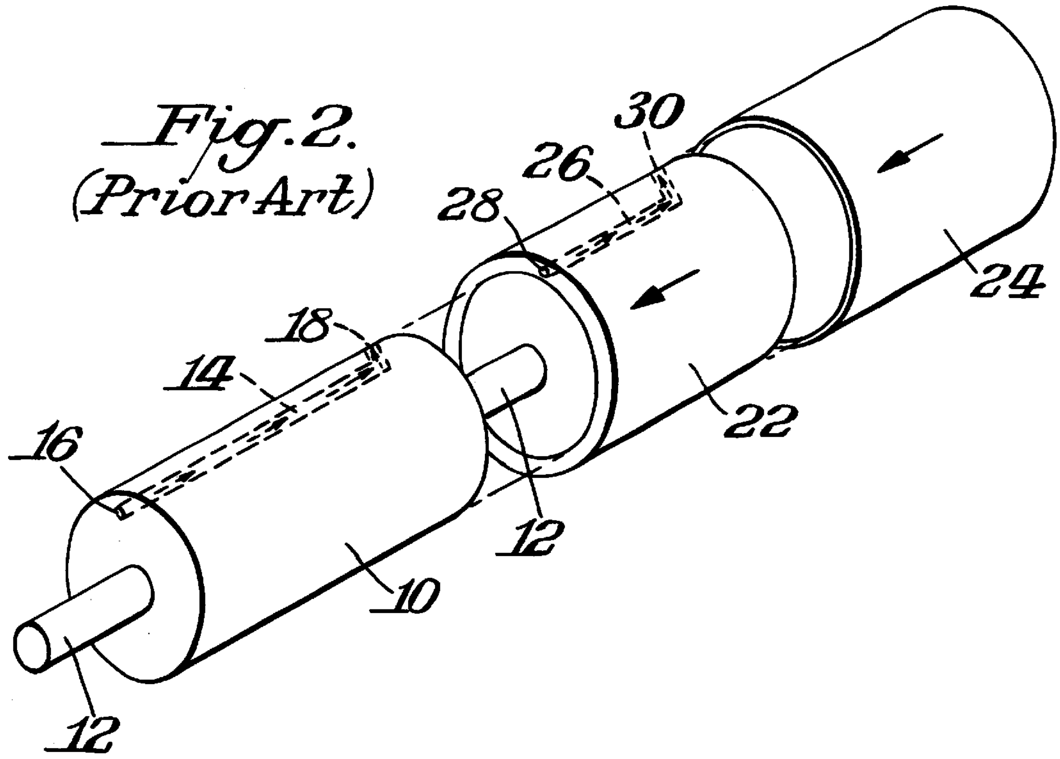
Fig. 2. (Prior Art)
Figure 3:
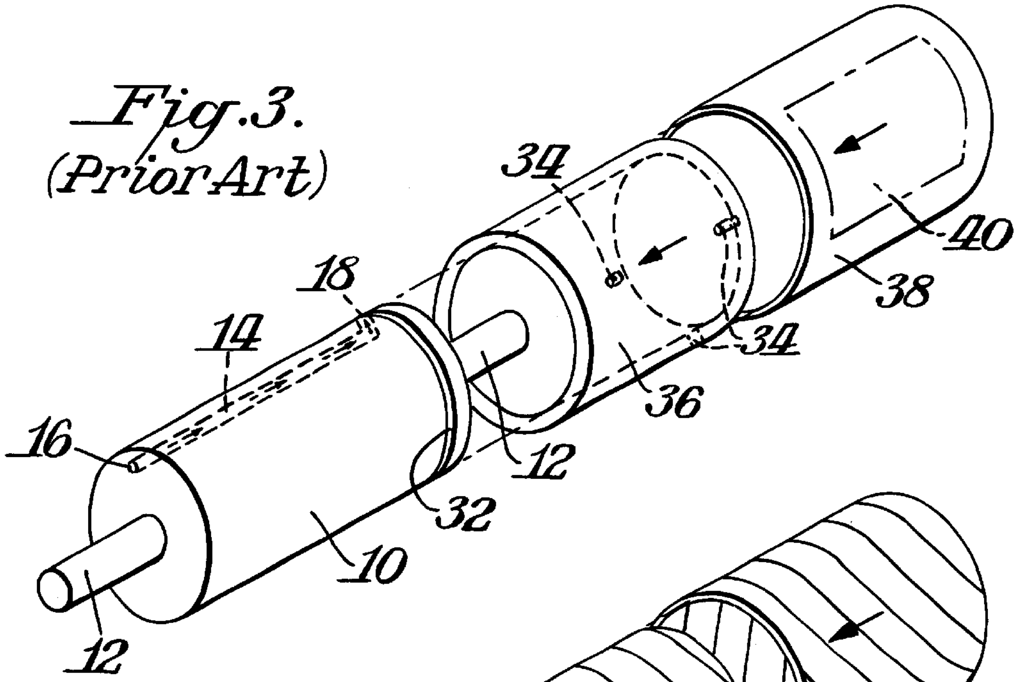
Fig. 3. (Prior Art)

A bridge sleeve must have the ability to accept a thin sleeve over its outer diameter. FIGS. 2 and 3 illustrate prior art techniques which use bridge sleeves. As shown in FIG. 2 a relatively thick bridge sleeve 22 is provided which would be disposed in final assembly between printing cylinder 10 and outer sleeve 24. Bridge sleeve 22 would include its own duct 26 having an inlet 28 and an outlet 30. In order to assemble the components air would be fed into inlet 16 of duct 14 in cylinder 10 so that the air discharged through outlet 18 would cause the bridge sleeve 22 to expand thus permitting the bridge sleeve to be mounted over printing cylinder 10 by moving in the direction of the arrow. In order to mount the thin outer sleeve 24 (after inner sleeve 22 is mounted in place) air would be supplied through inlet 28 into duct 26 and the air discharged through outlet 30 would cause the outer sleeve 24 to expand thereby permitting thin outer sleeve 24 to be assembled over bridge sleeve 22.

FIG. 3 illustrates a variation of the prior art technique of FIG. 2. As shown in FIG. 3 a peripheral groove 32 is formed in the outer surface of print cylinder 10 in communication with outlet 18. Bridge sleeve 36 would be mounted over cylinder 10 by expansion under the force of compressed air being fed through duct 14, outlet 18 and groove 32. When cylinder 36 is fully mounted on printing cylinder 10 a series of air outlets 34 in bridge cylinder 36 are aligned with groove 32. These aligned air outlets 34 are used to permit the passage of air from inlet 16 to flow through duct 14, outlet 18, groove 32 and then through outlets 34 so as to expand outer sleeve 38 thereby permitting the mounting of sleeve 38 over bridge sleeve 36.

FIG. 3 also shows in phantom a printing plate 40 secured to the outer surface of thin sleeve 38 in a known manner, such as by double sided adhesive tape. Such plate would be on the outer sleeve in all prior art embodiments and embodiments of the invention.

Figure 4:
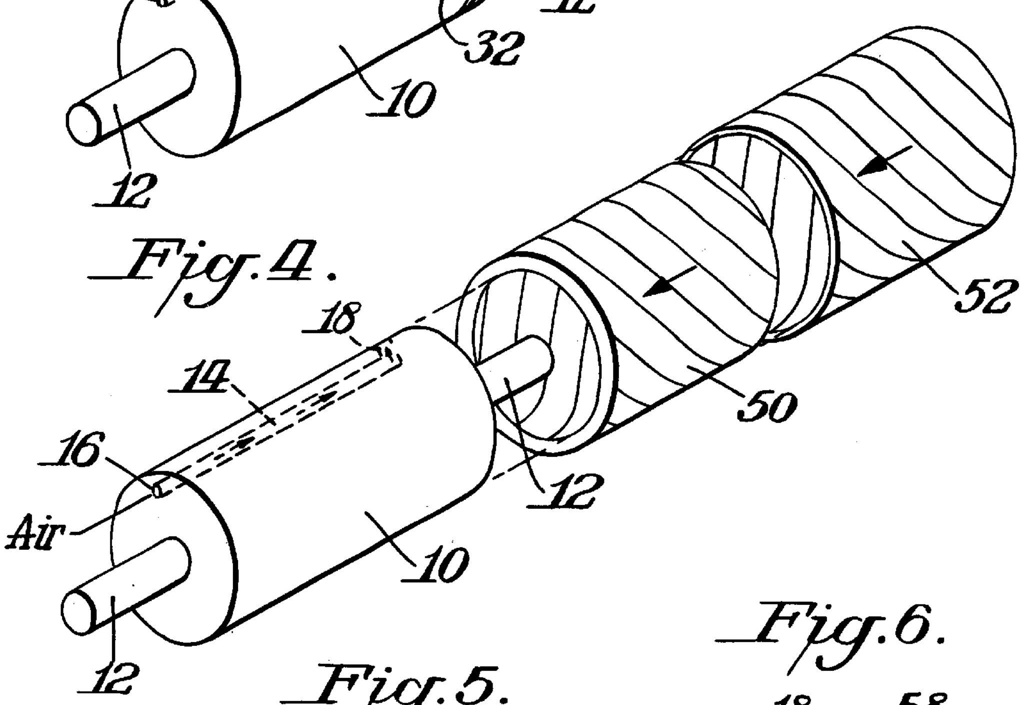
FIG. 4 is a view similar to FIGS. 1–3 showing a printing cylinder sleeve assembly in accordance with this invention.
Figure 5:
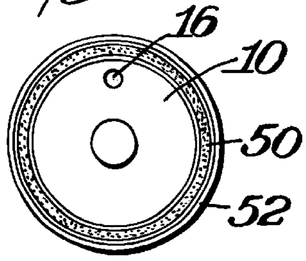
FIG. 5 is an end elevation view of the printing cylinder sleeve assembly mounted on a printing cylinder.
Figure 6:
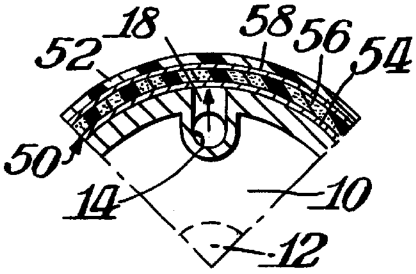
FIG. 6 is a fragmental view in cross section of a portion of the assembly shown in FIGS. 4–5 on an enlarged scale.

FIGS. 4–6 illustrate the printing cylinder sleeve assembly of this invention. As shown therein a printing cylinder 10 having an air duct 14 with its inlet 16 and outlet 18. In accordance with this invention a bridge or inner sleeve 50 is provided which would be mounted on printing cylinder 10 below outer thin sleeve 52. One feature which differentiates the bridge sleeve 50 and outer sleeve 52 from prior art design is that the sleeves 50,52 have a slip fit between them in contrast to an interference fit as used it the prior art. The slip fit results from clearance between the two sleeves to permit the sleeves to be preassembled and then mounted as a unit on cylinder 10. This differs from the prior art where the two sleeves are sequentially installed. Because of the slip fit the present invention does not require any air expansion of the outer sleeve. As a result, the sleeve assembly of the invention does not require air to install the outer sleeve because the slip fit mounting of the outer sleeve over the bridge or inner sleeve is made prior to installation of the assembly on the print cylinder. This can be achieved because the inner sleeve 50 is manufactured much smaller in diameter than its finished size and will expand to its final size once on the print cylinder 10. A further difference is that the prior art techniques use materials that do not allow this great an expansion, such as fibreglass, Kevlar® and nickel. In accordance with the present invention there is also an increase in the wall thickness so that the inner sleeve will compress and grip the outer sleeve. For example, the outer sleeve may have a thickness of from 0.020 to 0.120 inches.

The invention could be practiced with the use of any suitable materials. The inner sleeve preferably consists of material that will allow expansion, including, but not limited to Mylars® (PET) and foam or Mylar® itself, as later described. The outer thin sleeve 52 could be constructed of any wide range of materials since most of the expansion and compression is taking place with the inner sleeve 50. Such materials could include fiberglass, Kevlar®, nickel and Mylar®. Where Mylar® alone is used for the inner sleeve 50 (such as a multilayer laminate of Mylar® layers), the outer sleeve 52 could also be made of an expandable material such as Mylar®. Where inner sleeve SO includes a foam layer, it is not necessary to use an expandable material for the outer sleeve 52.

The inner sleeve 50 and outer sleeve 52 may be constructed in any suitable manner such as being extruded into a tubular seamless form. The inner sleeve 50 could be made into a tubular or cylindrical form by spirally wrapping the various layers of tube material around a mandrel to form the tube. This manner of manufacture permits a tight tolerance. The outer sleeve 52 could be formed by spirally wrapping layers of material with the spirals offset from each other. The outer sleeve 52 could be a composite laminate which is then ground to precision.

As best shown in FIG. 6 in the illustrated practice of the invention the inner sleeve 50 is a multi-layer laminate wherein an inner layer 54 of any suitable material, such as Mylar®, is spirally wound into a tubular form with an intermediate layer 56 of any suitable foam, such as polyurethane, spirally wound around inner layer 54. The two layers may be adhesively secured together. An outer layer 58 of a material, such as Mylar®, is spirally wound around intermediate foam layer 56 and adhesively secured to the foam layer. The various spirals are offset from each other so as to avoid the tube splitting at the junction of the side by side spiral portions.

It is to be understood that while inner sleeve 50 is illustrated in FIG. 6 as being a three-layer laminate, other structures may be used. For example, one or both of the inner or outer non-foam layers may be omitted. Alternatively, the entire inner sleeve itself could be made of a non-foam material as long as it is capable of expanding under the air pressure to facilitate the mounting of the assembly comprising sleeves 50,52 on printing cylinder 10. An advantage of using a foam layer is that the foam not only is expandable, but also the foam provides a cushioning effect. As noted above, however, it is to be understood that the specific reference to Mylar® and polyurethane as materials usable for making the sleeves is not intended to be limiting and that other equivalent materials having similar characteristics may be used. What is necessary is that such inner sleeve be capable of expanding to fit on the printing cylinder during the mounting process and then tending to contract. When the inner sleeve is expanded the clearance between the inner sleeve 50 and outer sleeve 52 will be eliminated and the expanded inner sleeve will be in intimate contact with the inner surface of the outer sleeve 52. As a result sleeves 50,52 act as a unit and rotate jointly with printing cylinder 10.

When it is desired to remove the sleeve assembly 50,52 from printing cylinder 10, air is passed through duct 14 to expand the sleeve 50 and thereby permit the assembly to be slid off printing cylinder 10. Once the assembly is removed inner sleeve 50 is free to contract to its original size thereby returning the assembly to its slip fit. AS a result outer sleeve 52 and its printing plate may be removed from inner sleeve 50. A different outer sleeve may then be slip fit on the same inner sleeve 50, while the removed outer sleeve 52 and its printing plate may be stored for later use.

What is claimed is:

1. A printing cylinder sleeve assembly comprising an inner sleeve made of material capable of expanding upon application of air pressure to the inner surface of said inner sleeve, an outer sleeve mounted peripherally around said inner sleeve, the outer surface of said inner sleeve and the inner surface of said outer sleeve being such as to create a slip fit of said outer sleeve over said inner sleeve, one of said inner sleeve and said outer sleeve including a foam layer, and said outer sleeve being capable of having a printing plate mounted to its outer periphery so as to form an assembly capable of being removably mounted as a unit to a printing cylinder.

2. The assembly of claim 1 wherein said inner sleeve includes said foam layer.

3. The assembly of claim 1 wherein said inner sleeve is of uniform thickness throughout its length, said inner sleeve having an outer surface, and said outer sleeve having an inner surface parallel to said outer surface of said inner sleeve without any spacer therebetween.

4. A printing cylinder sleeve assembly comprising an inner sleeve made of material capable of expanding upon application of air pressure to the inner surface of said inner sleeve, an outer sleeve mounted peripherally around said inner sleeve, the outer surface of said inner sleeve and the inner surface of said outer sleeve being such as to create a slip fit of said outer sleeve over said inner sleeve, said outer sleeve being capable of having a printing plate mounted to its outer periphery so as to form an assembly capable of being removably mounted as a unit to a printing cylinder, said inner sleeve being a multi-layer laminate, and said laminate includes an intermediate foam layer.

5. The assembly of claim 4 wherein said laminate includes inner and outer layers made of a smooth and shape-retaining and expandable material.

6. The assembly of claim 5 wherein said inner and outer layers are made of PET and said intermediate layer is made of polyurethane foam.

7. A printing cylinder sleeve assembly comprising an inner sleeve made of material capable of expanding upon application of air pressure to the inner surface of said inner sleeve, an outer sleeve mounted peripherally around said inner sleeve, the outer surface of said inner sleeve and the inner surface of said outer sleeve being such as to create a slip fit of said outer sleeve over said inner sleeve, said outer sleeve being capable of having a printing plate mounted to its outer periphery so as to form an assembly capable of being removably mounted as a unit to a printing cylinder, and said outer sleeve has a thickness of 0.020 to 0.120 inches.

8. A method of mounting a sleeve assembly over a printing cylinder in a printing press comprising mounting a thin outer sleeve over an inner sleeve wherein there is sufficient clearance between the inner surface of the outer sleeve and the outer surface of the inner sleeve to provide a slip fit of the inner sleeve over the outer sleeve to thereby form a sleeve assembly, mounting the sleeve assembly over a printing cylinder having an air duct which terminates in an air discharge outlet at the periphery of the outer surface of the printing cylinder, feeding air through the air duct and out of the outlet while the sleeve assembly is being mounted over the printing cylinder, expanding the inner sleeve outwardly under the pressure of the air to facilitate sliding the assembly over the printing cylinder, the expansion of the inner sleeve causing the outer surface of the inner sleeve to be in intimate contact with the inner surface of the outer sleeve to lock the inner sleeve to the outer sleeve as a result of the expansion of the inner sleeve, and discontinuing the flow of air after the assembly has been fully mounted on the printing cylinder.

9. The method of claim 8 including mounting a printing plate to the outer surface of the outer sleeve.

10. The method of claim 9 including forming the inner sleeve as a multi-layer laminate.

11. The method of claim 9 including expanding both the inner sleeve and the outer sleeve.

12. The method of claim 9 wherein the sleeve assembly is a first sleeve assembly, including removing the first sleeve assembly by expanding the inner sleeve sufficiently to slide the first sleeve assembly off the printing cylinder.

13. The method of claim 12 including sliding the inner sleeve and the outer sleeve away from each other after the first sleeve assembly has been removed with the printing plate remaining on the outer sleeve.

14. The method of claim 13 including repeating the mounting steps with a second sleeve assembly.

15. The method of claim 12 including repeating the mounting steps with a second sleeve assembly.

16. A method of mounting a sleeve assembly over a printing cylinder in a printing press comprising mounting a thin outer sleeve over an inner sleeve wherein there is sufficient clearance between the inner surface of the outer sleeve and the outer surface of the inner sleeve to provide a slip fit of the inner sleeve over the outer sleeve to thereby form a sleeve assembly, mounting the sleeve assembly over a printing cylinder having an air duct which terminates in an air discharge outlet at the periphery of the outer surface of the printing cylinder, feeding air through the air duct and out of the outlet while the sleeve assembly is being mounted over the printing cylinder, expanding the inner sleeve outwardly under the pressure of the air to facilitate sliding the assembly over the printing cylinder, the expansion of the inner sleeve causing the outer surface of the inner sleeve to be in intimate contact with the inner surface of the outer sleeve, discontinuing the flow of air after the assembly has been fully mounted on the printing cylinder, including mounting a printing plate to the outer surface of the outer sleeve, including forming the inner sleeve as a multi-layer laminate, and wherein the laminate is formed with an intermediate layer made of foam.

17. The method of claim 16 including expanding the inner sleeve without expanding the outer sleeve.

18. A printing cylinder sleeve assembly comprising an inner sleeve made of material capable of expanding upon application of air pressure to the inner surface of said inner sleeve, an outer sleeve mounted peripherally around said inner sleeve, the outer surface of said inner sleeve and the inner surface of said outer sleeve being such as to create a slip fit of said outer sleeve over said inner sleeve, said inner sleeve being of uniform thickness, said inner surface of said outer sleeve being parallel to said outer surface of said inner surface, and said outer sleeve being capable of having a printing plate mounted to its outer periphery so as to form an assembly capable of being removably mounted as a unit to a printing cylinder.

19. The assembly of claim 18 wherein said inner sleeve is a multi-layer laminate.

20. The assembly of claim 18 wherein said outer sleeve is of uniform thickness.

21. The assembly of claim 18 wherein said outer surface of said inner sleeve is uniformly spaced from said inner surface of said outer sleeve throughout substantially the entirety of said outer surface and said inner surface, and said inner sleeve being made of a material having greater expandability than said outer sleeve.

22. The assembly of claim 18 wherein said inner sleeve has a closed ring cross section.

23. The assembly of claim 18 wherein said inner sleeve includes a layer made of PET.

24. The assembly of claim 19 wherein said inner sleeve includes a layer made of PET.

25. The assembly of claim 18 wherein said outer sleeve is made of a non-expandable material.

26. The assembly of claim 18 wherein said outer sleeve is made of expandable material.

27. The assembly of claim 18 in combination with a printing cylinder, said printing cylinder having air passage supply structure directed against the inner surface of said inner sleeve for expanding said inner sleeve to permit said inner sleeve to be mounted over said printing cylinder and to expand said inner sleeve into intimate contact with the inner surface of said outer sleeve, and said assembly being mounted over said printing cylinder.

28. The assembly of claim 27 including a printing plate mounted to said outer sleeve.

* * * * *